Feb. 9, 1926.  
W. A. RIDDELL  
1,572,246  
SHUTTER FOR PANORAMIC CAMERAS  
Filed April 15, 1925  
2 Sheets-Sheet 1

INVENTOR,
William A. Riddell,
BY
ATTORNEYS.

Feb. 9, 1926.　　　　　　　1,572,246
W. A. RIDDELL
SHUTTER FOR PANORAMIC CAMERAS
Filed April 15, 1925　　2 Sheets-Sheet 2
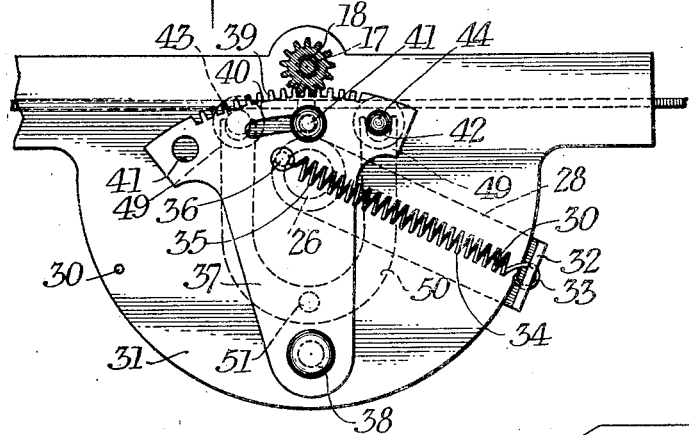
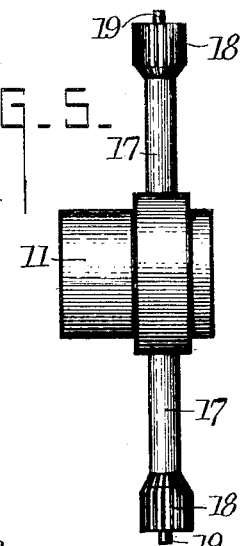
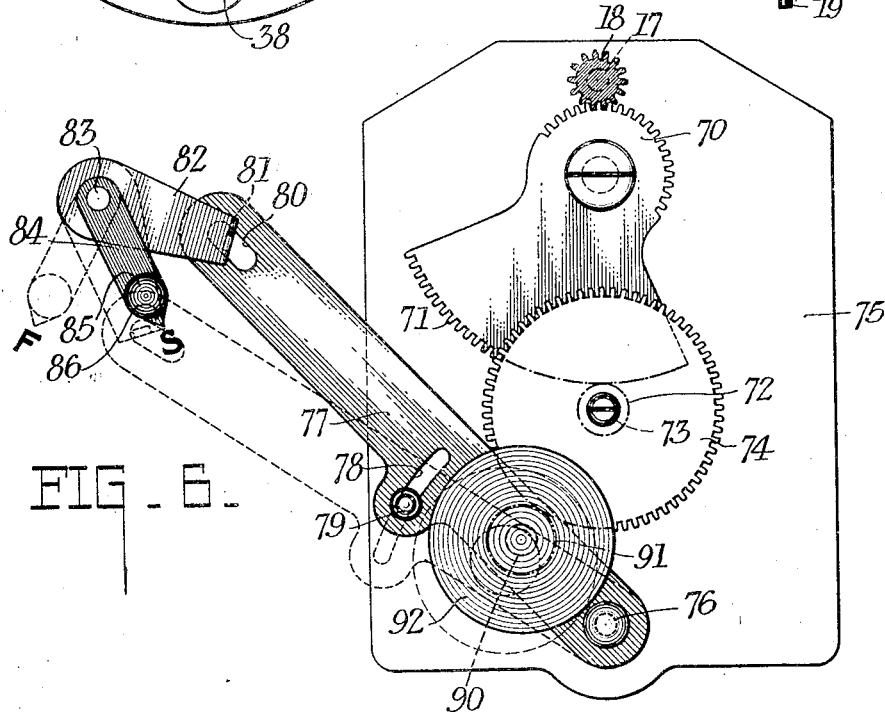
INVENTOR,
William A. Riddell,
BY
ATTORNEYS.

Patented Feb. 9, 1926.

1,572,246

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

SHUTTER FOR PANORAMIC CAMERAS.

Application filed April 15, 1925. Serial No. 23,425.

*To all whom it may concern:*

Be it known that I, WILLIAM A. RIDDELL, a citizen of the United States of America, residing at Rochester, in the county of Monroe and State of New York, have invented certain new and useful Improvements in Shutters for Panoramic Cameras, of which the following is a full, clear, and exact specification.

My present invention relates to photography and more particularly to panoramic photographic cameras. One object of my invention is to provide a shutter mechanism having conveniently arranged operating devices. Another object is to provide a camera having a latch mechanism which will hold the lens carrier definitely in its two positions of rest, and one which will also prevent the lens carrier from rebounding after an exposure is made. Another object is to provide a latch mechanism which will function regardless of the method of operating the lens carrier releasing mechanism, as the rebound controlling part of the latch may act independently of the releasing latch. Another object is to control the speed of the lens carrier, and other objects will appear from the following specification, the novel features being particularly pointed out in the claims at the end thereof.

Coming now to the drawings wherein like reference characters denote like parts throughout:

Fig. 4 is a section taken on line 4—4 of Fig. 3;

Fig. 5 is a side elevation of the lens carrier shafts and pinions; and

Fig. 6 is a fragmentary plan view part in section showing the gear retarding device.

Figure 1:
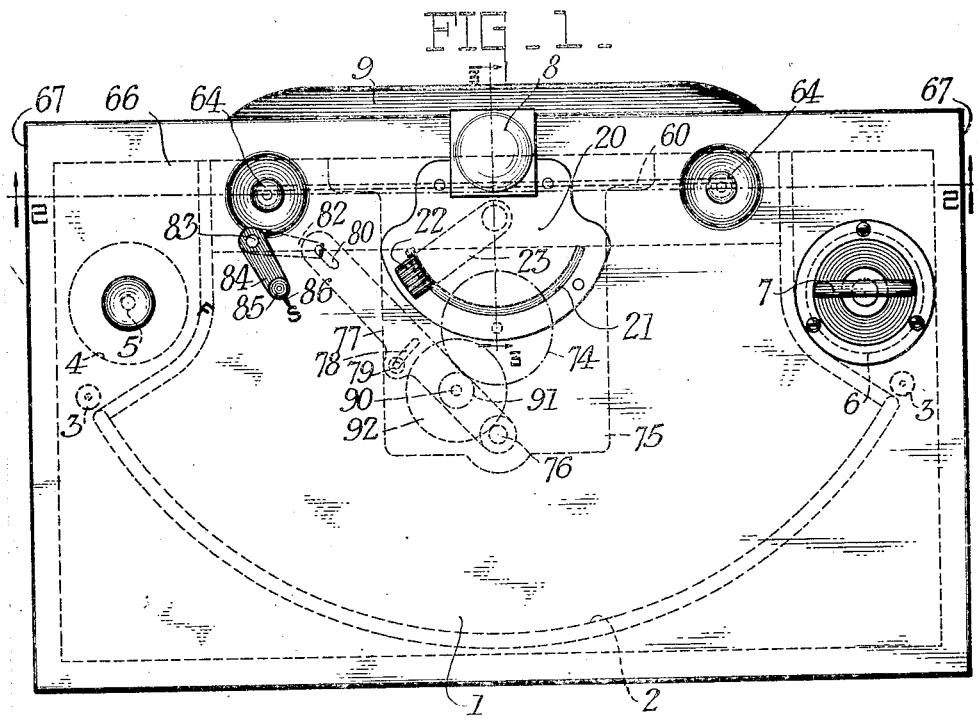
Fig. 1 is a plan view of a panoramic camera constructed in accordance with and illustrating one embodiment of my invention.

As shown in Fig. 1, the camera comprises a box 1 in which there is a curved guideway 2 at each end of which are mounted rollers 3. Film is drawn from a spool 4 mounted upon centering pins 5 (only one being shown) across the rollers 3 to a take-up spool 6 which may be turned by the winding key 7 in the usual manner. The camera is provided with the usual finder 8, and there is a curved face plate 9 which has an opening 10 through which the lens tube 11 may project, this tube having a light-tight connection with the plate 9 consisting of a flexible leather wall 12.

There is an objective consisting in this case of the lens elements 13 and 14 mounted in the lens tube 11. At the rear of this objective there is a tubular member 15 which supports an outwardly flaring housing 16 of the type shown in U. S. Patent No. 658,159, Brownell, December 17, 1901. My present invention is for an improvement over the panoramic camera shown in this patent.

Figure 3:
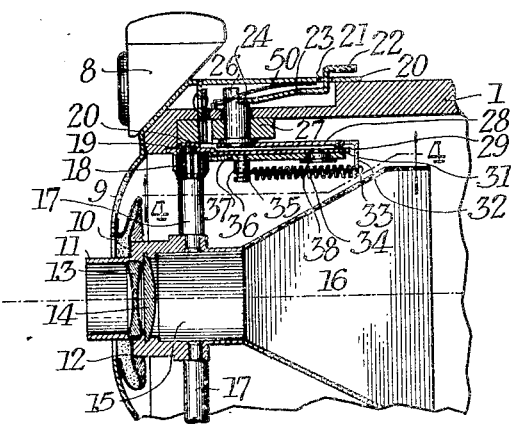
Fig. 3 is a fragmentary section on line 3—3 of Fig. 1 with some of the parts shown in elevation and some of the parts shown in a different position from that shown in Fig. 1.

The tube 15 is supported upon shafts 17, best shown in Fig. 5. These shafts are provided with pinions 18 and preferably carry pins 19 which turn freely in bearings 20 (one of which is shown in Fig. 3).

Figure 2:
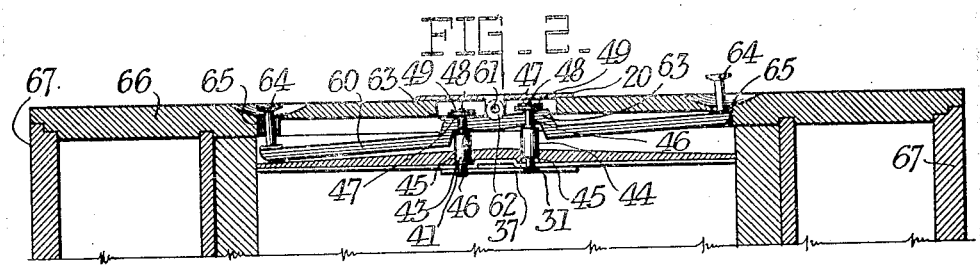
Fig. 2 is a fragmentary section on line 2—2 of Fig. 1.

In order to swing the lens tube and the housing 16 about the shafts 17 to make an exposure the following mechanism is used. On the top of the camera box 1 there is mounted a plate 20 having an arcuate slot 21 cut therein. One end 22 of a lever 23 projects through this slot and the other end 24 of the lever is attached to an arbor or shaft 26 which may turn in a suitable bearing 27. This arbor carries an arm 28 affixed thereto so that when the finger grip 22 is used to swing lever 23 through the slot 21, arm 28 will also swing between two positions which are defined by the struck-up portion 29 engaging either one of two apertures 30 (Fig. 4) in plate 31 which is fixedly attached to an inner wall of the camera. Arm 28 has a downwardly extending arm 32 which carries one end 33 of a spring 34, the other end of which 35 is attached to a stud 36. This stud is carried by a lever 37 pivoted at 38 to plate 31, and the lever carries a gear segment 39 adapted to mesh with the upper pinion 18 of shaft 17 which carries the lens tube. Lever 37 is provided with a slot 40 which limits the movement of this lever as it rides about stud 41. There are a pair of apertures 41 and 42 in the ends of this lever, and these apertures are arranged to swing to and from a position in which the pins 43 and 44 may project into the apertures. As best shown in Fig. 2, these pins are slidably mounted in similar bearings 45 and are both provided with reduced shanks 46 and enlarged heads 47 from which pins 48 project upwardly. These pins are engaged by the ends 49 of a substantially U-shaped spring 50 which is attached at 51 to the underside of plate 20. This spring normally exerts a downward pressure upon both of the pins so that they will press against the lever 37, and when an aperture 41 or 42 comes beneath a pin, it will drop into the aperture thus forming a latch to hold plate 37 in either of its two positions of rest. The apertures 41 or 42 form a detent into which a pin 43 or 44 may snap so that this mechanism provides a double latch for lever 37.

Either of these two pins may be moved against the pressure of spring 50 by means of a rocker arm 60 which is pivoted at 61 to a flange 62 formed downwardly from plate 20. This rocker arm has a pair of upwardly extending lugs 63 which are adapted to engage under the enlarged heads 49 of the pins. The ends of the rocker arms carry push buttons 64 which are adapted to operate through apertures 65 in the camera wall 66. It should be noted here that these push buttons are spaced quite a distance apart so as to lie near the ends 67 of the camera. This greatly facilitates holding the camera steady in making an exposure as a button 64 may be conveniently pushed by the thumb of the hand used to hold the camera steady. It should be noted that while either pin 43 or 44 may be raised upwardly by means of the rocker arm 60, the sole means of moving the pins downwardly is a tension of spring 37 so that the pins may be in effect independently moved, that is, one pin may be raised without altering the position of the other pin at all. This is useful because one pin is always pressing on lever 37 ready to drop into an aperture so as to prevent rebound by holding the lever still at the end of each stroke.

In order to retard the speed of the exposure, the device best shown in Fig. 6 is used. This consists of a gear train, one gear of which 70 meshes with the lower pinion 18 on shaft 17 and is provided with teeth 71 meshing with a pinion 72 on a shaft 73 which also carries a gear 74. Shaft 73 is carried by the plate 75 affixed to the bottom of the camera so that the portion of the gear train just described always moves when the lens barrel 11 is moved. A stud 76 carried by plate 75 supports an arm 77. This arm is slotted at 78 so that it may be guided in its movement about stud 76 by means of a second stud 79 which passes up through the arcuate slot 78, limiting the movement of lever 77. On the outer end of this lever there is a slot 80 which is engaged by a lug 81 extending downwardly from the lever 82 which is carried by a shaft 83. This shaft extends up through the top wall 66 of the camera casing, and is provided with a lever 84 equipped with a finger grip 85 and a pointer 86 which may be moved to the speed indicating symbols F and S which indicate a fast or slow exposure. Arm 77 carries a stud 90 to which is attached a pinion 91 and a weighted member in a form of a wheel 92. When the parts are in the position shown in full lines in Fig. 6, gears 91 and 74 are in mesh and a slow exposure can be made. To make a fast exposure, lever 84 is moved to the position shown in dashed lines in which position gears 74 and 91 are no longer in mesh so that the retarding action of that part of the gear train carried by lever 87 will not affect the shutter.

The operation of my camera is as follows: In order to make an exposure, the lever 22 is moved to place the spring 34 under tension. As this member is moved through the arcuate slot 21, the operator can feel the protuberance 29 snap into an aperture 30. One of the shutter releasing members 64 is then depressed so that the rocking arm 60 will be actuated and pin 44 (when the parts are in the position shown in Fig. 4) is withdrawn from aperture 42, thereby permitting spring 34 to move the pivoted lever 37 and with it pinion 18 and shaft 17, thus rotating the housing 16 through the angle necessary to make an exposure. As the pivoted lever 37 swings, pin 43 rides along the face of the lever until aperture 41 is reached at which time spring 37 presses the pin into the aperture and prevents lever 37 from rebounding before it comes to rest. The next picture is made by setting the spring 34 in a reverse direction by swinging lever 22 through slot 21. The remaining operations are the same except that the opposite push button 64 is depressed to move the rocker arm 60.

In order to make a fast or slow exposure, lever 84 is moved so that pointer 86 will indicate the desired exposure.

While I have described a preferred embodiment of my invention, I do not wish to be restricted to the form shown in the drawings and described in the specification except as indicated in the accompanying claims.

Having thus described my invention, what I claim as new and desire to secure by Letters Patent is:

1. In a panoramic camera, the combination with a swinging lens holder having a pinion, of a pivoted lever having teeth engaging the pinion, a spring for moving the pinion, stop pins mounted adjacent the lever and spring pressed toward the lever, detents in the lever adapted to be engaged by the pins, and means for moving the pins against their spring pressure whereby when one pin is moved from the lever detent the lever may swing until the other pin, under the impulse of its spring will snap into the other detent to hold the lever at the end of its stroke.

2. In a panoramic camera, the combination with a swinging lens holder having a pinion, of a pivoted lever having teeth engaging the pinion, a spring for moving the pinion, stop pins mounted adjacent the lever and spring pressed toward the lever, detents in the lever adapted to be engaged by the pins, and a rocker arm adapted to engage and move the pins alternately against spring pressure whereby one pin will be moved from one detent permitting the pivoted lever to swing, until the other pin engages the other detent.

3. In a panoramic camera, the combination with a swinging lens holder having a pinion, of a pivoted lever having teeth engaging the pinion, a spring for moving the pinion, means for setting the spring to drive the lever in either direction, detents in the lever, two pins adapted to engage the detents, means for moving the pins toward the detents and a rocker arm for moving one pin at a time against the pin moving means, the two pins alternately serving to hold the lever against the driving spring pressure until the rocker arm releases the lever and serving to hold the lever at the end of its movement.

4. In a panoramic camera, the combination with an oscillatory lens holder having a pinion, of a pivoted lever having teeth meshing with the pinion, an oscillatory arbor having an arm, a spring connected to the arm and to the lever, and a spring-catch arrangement including a plurality of lever engaging members adapted for holding the lever before and after an actuation, one member approaching an operative lever retaining position as another member is moved from such a position.

5. In a panoramic camera, the combination with an oscillatory lens holder having a pinion, of a pivoted lever having teeth meshing with the pinion, an oscillatory arbor having an arm, a spring connected to the arm and to the lever, and a spring-catch arrangement including a plurality of lever engaging members adapted for holding the lever before and after an actuation, and means for operating the lever engaging members.

6. In a panoramic camera, the combination with an oscillatory lens holder having a pinion, of a pivoted lever having teeth meshing with the pinion, an oscillatory arbor having an arm, a spring connected to the arm and to the lever, and a spring-catch arrangement including a plurality of lever engaging members adapted for holding the lever before and after an actuation, and a rocker arm for operating the lever engaging members, said rocker arm having buttons spaced from each other and located near the sides of the camera.

7. In a panoramic camera the combination with a swinging lens carrier, of a mechanism interconnected with the lens carrier adapted to move the carrier for making an exposure, a carrier releasing device including a pair of spaced members located near the sides of the camera whereby the members are accessible to the hands of an operator holding the camera.

8. In a panoramic camera the combination with a swinging lens holder having pinions, of a lens holder moving device connected to one pinion, and a lens holder retarding device carried by another pinion, said retarding device comprising a plurality of gears, a movable lever for carrying a portion of the retarding device, and means located outside of the camera for moving the lever to increase or decrease the retarding action.

9. In a panoramic camera the combination with a swinging lens holder having pinions, of a lens holder moving device connected to one pinion, and a lens holder retarding device carried by another pinion, said retarding device comprising a plurality of gears terminating in a weighted member, a pivoted lever adapted to carry a portion of the gear train and the weighted member, said lever being movable to mesh or unmesh two gears in the train, and means on the exterior of the camera casing for moving the lever whereby the retarding action may be altered at will.

10. In a panoramic camera, the combination with an oscillatory lens holder, of a motor spring for driving the oscillatory lens holder, connections between the lens holder and the spring including a swinging lever, a spring latch device including a plurality of lever engaging members adapted for holding the lever before and after exposure, one member being adapted to hold the swinging lever at each end of its stroke.

11. In a panoramic camera, the combination with an oscillatory lens holder, of a motor spring for driving the oscillatory lens holder, connections between the lens holder and the spring including a swinging lever, a spring latch device including a plurality of lever engaging members adapted for holding the lever before and after exposure, one member approaching its latching position as another member is released from its latching position, and means for actuating the lever engaging members.

12. In a panoramic camera, the combination with an oscillatory lens holder, of a motor spring for driving the oscillatory lens holder, connections between the lens holder and the spring including a swinging lever, a spring latch device including a plurality of lever engaging members adapted for holding the lever before and after exposure, one member approaching its latching position as another member is released from its latching position, and a rocker arm adapted to engage and move a single lever engaging member at a time.

13. In a panoramic camera, the combination with an oscillatory lens holder, of a motor spring for driving the oscillatory lens holder, connections between the lens holder and the spring including a swinging lever, a spring latch device including a plurality of lever engaging members adapted for holding the lever before and after exposure, one member approaching its latching position as another member is released from its latching position, and a rocker arm associated with the lever engaging members and arranged to move a single lever engaging member independently of the other lever engaging member.

Signed at Rochester, New York this 10th day of April 1925.

WILLIAM A. RIDDELL.